(12) United States Patent
Albou et al.

(10) Patent No.: US 10,906,461 B2
(45) Date of Patent: Feb. 2, 2021

(54) COMPACT OPTICAL SYSTEM FOR A MOTOR-VEHICLE PASSENGER COMPARTMENT

(71) Applicant: VALEO VISION, Bobigny (FR)

(72) Inventors: Pierre Albou, Bobigny (FR); Nicolas Lefaudeux, Bobigny (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 16/568,317

(22) Filed: Sep. 12, 2019

(65) Prior Publication Data
US 2020/0079285 A1    Mar. 12, 2020

(30) Foreign Application Priority Data

Sep. 12, 2018 (FR) .................... 18 58175

(51) Int. Cl.
*B60Q 3/62* (2017.01)
*F21V 3/04* (2018.01)
(Continued)

(52) U.S. Cl.
CPC ............... *B60Q 3/62* (2017.02); *B60Q 3/74* (2017.02); *F21V 3/049* (2013.01); *F21V 7/28* (2018.02); *F21W 2106/00* (2018.01)

(58) Field of Classification Search
CPC ... B60Q 3/62; B60Q 3/74; B60Q 3/76; B60Q 3/60; F21V 7/28; F21V 3/049;
(Continued)

(56) References Cited

U.S. PATENT DOCUMENTS 3,822,930 A    7/1974  Douklias
4,453,806 A    6/1984  Wick
(Continued)

FOREIGN PATENT DOCUMENTS

CN    202209585 U    5/2012
EP    0 766 115 A1   4/1997
(Continued)

OTHER PUBLICATIONS

French Preliminary Search Report dated Apr. 12, 2019 in French Application 18 58175, filed on Sep. 12, 2018 (with English translation of Categories of Cited Documents).

*Primary Examiner* — Bao Q Truong
(74) *Attorney, Agent, or Firm* — Oblon, McClelland, Maier & Neustadt, L.L.P.

(57) ABSTRACT

An optical system and an interior lighting device for a motor vehicle including a light source coupled to such an optical system. The optical system includes a first portion of an optical assembly that allows a real image of the light source to the enlarged and projected into proximity to a diffuser of the optical system. The optical assembly also includes a second portion that plays the role of a projecting optic to project out of the optical system a real image of the of the light source formed in proximity to the diffuser. The optical system allows a luminance of the light source of the interior lighting device to be decreased while preserving its pixelization, allowing light sources based on light-emitting diodes and driven with a high-amperage electrical current to be used in motor-vehicle passenger compartments without any risk to the occupants.

20 Claims, 2 Drawing Sheets

(51) Int. Cl.
    *B60Q 3/74*         (2017.01)
    *F21V 7/28*         (2018.01)
    *F21W 106/00*     (2018.01)

(58) Field of Classification Search
    CPC ........ F21V 13/00; F21V 13/02; F21V 7/0091; F21V 7/0041; F21V 5/008; F21W 2106/00; G02B 19/00; G02B 19/0004; G02B 5/02; G02B 19/0061; G02B 5/0221; G02B 19/0028; G02B 5/0278
    See application file for complete search history.

(56) References Cited

U.S. PATENT DOCUMENTS

| | | |
|---|---|---|
| 5,841,596 A | 11/1998 | Perlo et al. |
| 2003/0026002 A1 | 2/2003 | Lopez-Hernandez et al. |
| 2005/0213180 A1 | 9/2005 | Lopez-Hernandez et al. |
| 2017/0280031 A1* | 9/2017 | Price .................. G02B 19/0014 |
| 2017/0336049 A1* | 11/2017 | Shyu ...................... F21V 13/02 |
| 2018/0132330 A1 | 5/2018 | Chong et al. |

FOREIGN PATENT DOCUMENTS

| | | |
|---|---|---|
| FR | 3 047 946 A1 | 8/2017 |
| WO | WO 2005/116711 A1 | 12/2005 |

* cited by examiner

COMPACT OPTICAL SYSTEM FOR A MOTOR-VEHICLE PASSENGER COMPARTMENT

TECHNICAL FIELD

The present invention relates to the field of the automotive industry, and more particularly relates to interior lighting devices, in particular those for motor-vehicle passenger compartments.

PRIOR ART

Known motor-vehicle passenger compartments comprise many interior lighting devices in order to allow a plurality of luminous functions to be performed. By way of nonlimiting examples of known luminous functions, certain interior lighting devices allow luminous indications to be displayed from or on a wall of the passenger compartment; certain interior lighting devices allow manual controls of the motor vehicle to be lit up; and certain other interior lighting devices are dedicated to lighting one portion of a space inside the passenger compartment of the motor vehicle.

One particularity common to all these devices is that they must meet strict dimensional constraints as a result of the increase in the number of electrical devices—whether used for lighting or not—in such motor-vehicle passenger compartments. Thus, although the luminous functionalities provided by interior lighting devices are increasing in number in order to meet the demands of manufacturers and users of motor vehicles, the housings available in passenger compartments are at the same time becoming scarcer. This has led to a need for miniaturization, in order to be able to continue to provide known luminous functions and/or in order to allow new luminous functions to be performed in motor-vehicle passenger compartments.

More particularly, it is known to use high-luminance light sources that are said to be pixelated in such interior lighting devices: these light sources are small in size and allow some of the aforementioned dimensional constraints to be more easily met. Furthermore, they have a low purchase price and thus allow the manufacturing cost of these interior lighting devices to be decreased.

However, the conjugation of their small size and their high luminance makes such pixelated light sources incompatible with a use in the passenger compartment of a motor vehicle, because they present a potential risk to the human eye and they decrease the comfort of users of the motor vehicle.

The object of the present invention is to respond at least substantially to the preceding problems and to furthermore achieve other advantages by providing a new optical system for use in a motor-vehicle passenger compartment.

Another aim of the present invention is to decrease the bulk of such an optical system with respect to those implemented in known interior lighting devices.

Another aim of the present invention is to decrease the luminance of a pixelated light source while preserving its pixelization.

Another aim of the invention is to limit the manufacturing cost of such an optical system and of a lighting device comprising such an optical system.

SUMMARY OF THE INVENTION

According to a first aspect of the invention, at least one of the aforementioned objectives is achieved with an optical system for a motor-vehicle passenger compartment, the optical system comprising (i) a diffuser configured to scatter incident light rays of a light beam generated by a light source, and (ii) an optical assembly configured to project a real image of the light source onto the diffuser, a first etendue of the light beam measured at the light source being smaller than a second etendue of the light beam measured at an exit face of the optical assembly.

Thus, the ingenious use of the diffuser allows the optical system according to the first aspect of the invention to decrease a luminance of the light source intended to collaborate therewith. Furthermore, the optical system according to the first aspect of the invention is configured to preserve the pixelization of the light source. In other words, a shape and/or a geometry of the light source intended to collaborate with the optical assembly is substantially preserved at the exit of the optical assembly and/or of the optical system. Therefore, the light rays that penetrate into the optical system according to the first aspect of the invention exit therefrom with a decreased luminance and while preserving substantially the same spatial distribution as they had on entering. In other words, the optical system is configured to perform a homothetic transformation of the light source with which it is intended to collaborate—and preferably a homothetic transformation of the type of an enlargement. The use of the diffuser furthermore allows an opening angle of the light rays passing through the optical system to be modified.

The diffuser of the optical system according to the first aspect of the invention is configured to scatter—preferably without absorption—any of the light rays—called incident light rays—that reach its surface. The light rays scattered by the diffuser of the optical system according to the first aspect of the invention are emitted in a plurality of directions from said diffuser, preferably without privileged propagation direction. In other words, a luminance of the diffuser is isotropic, whatever the orientation of the incident light rays.

The optical assembly according to the first aspect of the invention is intended to collaborate with the light source in order to project the light rays generated thereby towards the diffuser. To this end, the diffuser is located on a side that is opposite to a position of the light source with respect to the optical assembly when the optical system according to the first aspect of the invention is used with said light source.

According to the first aspect of the invention, the optical system allows the etendue of the light beam that passes through said optical system to be increased between (i) an entrance face located on the side of the light source intended to collaborate with the optical system and (ii) the exit face of the optical system.

The etendue of a light beam characterizes how "spread out" the light rays emitted by a light source and that reach the receiver in question are. The etendue of the light beam corresponds to a geometric quantity (in $m^2 \cdot sr$) characterizing a size and a shape of the subset of light rays generated by the light source and that reach the receiver. In other words, the etendue of the light beam characterizes the way in which the beam of light rays is distributed over an emitting area and the light rays angularly in said light beam. By way of approximative example, in the case of a light source that emits in a semi-sphere, such as a light-emitting diode, the etendue of the light beam is obtained by multiplying the light cone of the light source in question—i.e. the smallest cone inside of which all the light rays generated by said light source fit—by the emission area. Other methods for calculating etendue are applicable to other types of light sources and are well known to those skilled in the art.

Thus, by virtue of the optical system according to the first aspect of the invention, the light cone at the exit of said optical system is larger than the light cone of the light source that is located at the entrance of said optical system.

According to one main advantage of the first aspect of the invention, such an optical system is compact and thus allows the bulk of such an optical system to be decreased with respect to those employed in known interior lighting devices. Furthermore, the production of such an optical system allows manufacturing cost to be limited.

The optical system according to the first aspect of the invention may advantageously comprise at least one of the following improvements, the technical features forming these improvements being able to be applied alone or in combination:

- the optical assembly comprises (i) a first portion optically located between the light source and the diffuser, the first portion being able to anamorphose the light source, and (ii) a second portion optically located between the diffuser and the exit face of the optical assembly, the second portion being an optic for projecting the light rays scattered by the diffuser. The adverb "optically" is here understood to mean in the direction of travel of the light rays in the optical system during its normal use. The first portion of the optical assembly in particular allows a real image of the light source with which the optical system is intended to collaborate to be created, this image being larger than the actual size of the source; the light cone of such a real image of the light source is smaller than the light cone of said light source as such. The projecting optic forming the second portion of the optical assembly is configured to create a second real image of the real image—called the first real image—of the light source on the diffuser. Optionally, the projecting optic creates the second real image by way of an anamorphosis. The second real image created by the projecting optic is located at a—finite or infinite—distance that is very large with respect to the dimensions of the optical system according to the first aspect of the invention. By way of nonlimiting example, the distance at which the second real image is created is at least 30 times, and preferably 100 times, larger than the dimensions of the optical system;
- the first portion of the optical assembly advantageously provides an enlargement greater than 1, and preferably greater than 2;
- the projecting optic forming the second portion of the optical assembly comprises one or more reflectors and/or one or more lenses and/or one or more light guides;
- the first portion of the optical assembly is made of the same material as and integrally formed with the diffuser, and/or the second portion of the optical assembly is made of the same material as and integrally formed with the diffuser. By "made of the same material as and integrally formed with" or "made of the same material and integrally formed", what is meant is that the two parts in question are made using the same manufacturing process, and that they cannot be separated from each other without damaging or breaking one or both of these parts. Thus, according to a first embodiment, the first element is made of the same material as and integrally formed with the diffuser, said diffuser being formed on one of the faces of said first element. According to a second embodiment, the projecting optic is made of the same material as and integrally formed with the diffuser, said diffuser being formed on one of the faces of said projecting optic. According to a third embodiment, the first element and the diffuser and the projecting optic are all made of the same material and integrally formed together;
- the first portion of the optical assembly comprises a first reflector associated with a second reflector, the second reflector being configured to reflect light rays reflected by the first reflector. The first and/or the second reflector are preferably obtained by coating a first portion of the first element with aluminium;
- the first reflector is configured to concentrate the light rays onto the second reflector;
- a first optical axis associated with the first portion of the optical assembly is secant to a second optical axis associated with the second portion of said optical assembly. This advantageous configuration thus allows the optical system according to the first aspect of the invention to be given a "dog-legged" shape, thus decreasing its dimensional bulk. More particularly, an angle made by the first optical axis and the second optical axis is comprised between 70° and 110°. In the context of the invention, the optical axis is defined by a centroidal light ray emitted or formed by the corresponding optical assembly or by the corresponding light source;
- the diffuser is configured to diffract the incident light rays. In other words, the diffuser of the optical system is configured to deviate the incident light rays coherently, in such as a way as to lead to interference. To this end, the diffuser may comprise a one-dimensional or two-dimensional array of patterns that protrude or are recessed with respect to a surface of incidence of the diffuser. By way of nonlimiting example, such a diffractive diffuser may take the form of a holographic diffuser;
- the diffuser is a "through" diffuser, the light rays incident on a face of incidence of the diffuser being scattered at a face that is opposite to the face of incidence with respect to the first portion of the optical assembly. This advantageous configuration allows an optical system of more compact geometry to be produced;
- the diffuser is configured to be at least partially reflective. In other words, the diffuser is configured to be able to reflect at least some of the incident light rays;
- the diffuser comprises a rough scattering surface. By "rough" what is meant is that the scattering surface comprises asperities in its scattering surface that lead the incident light rays to be scattered. Control of the dimensions of the asperities and/or of a density of said asperities allows the diffusive character of the diffuser to be defined;
- the rough scattering surface of the diffuser is grained. By way of nonlimiting example, such a scattering surface of the diffuser may be obtained by sandblasting;
- the diffuser comprises a curved surface;
- the optical assembly is advantageously made from a plastic and/or from glass. Polycarbonate (PC), polypropylene carbonate (PPC) or polymethyl methacrylate (PMMA) will preferably be used.

According to a second aspect of the invention, an interior lighting device for a motor-vehicle ceiling light is provided, the interior lighting device comprising:

- an optical system as defined above;
- a light source associated with the optical system and configured to generate light rays that the optical assembly of the optical system projects onto the diffuser of said optical system, the light rays that pass through the exit face of said optical system being intended to illuminate one portion of a passenger compartment of the motor vehicle.

Thus, the lighting device according to the second aspect of the invention makes it possible to provide an interior light, for a motor-vehicle passenger compartment, that decreases the luminance of the light sources used and that thus makes the latter compatible with such a use in a motor-vehicle passenger compartment.

The interior lighting device according to the second aspect of the invention may advantageously comprise at least one of the following improvements, the technical features forming these improvements being able to be applied alone or in combination:

the light source is pixelated and comprises a plurality of light-emitting diodes organized into an array. Preferably, the array of light-emitting diodes is one-dimensional or, preferably, two-dimensional. This advantageous configuration thus allows pixelated light sources to be made compatible with use in a motor-vehicle passenger compartment, without modifying the way in which they are driven electrically, and in particular the magnitude of the control current of such pixelated light sources;

the light-emitting diodes forming the pixelated light source are advantageously driven with an electrical signal an electrical current of which has a high magnitude, for example higher than 1 amp.

Various embodiments of the invention are provided, integrating in all of the possible combinations thereof the various optional features described here.

DESCRIPTION OF THE FIGURES

Other features and advantages of the invention will become more clearly apparent on the one hand from the following description, and on the other hand from a plurality of example embodiments that are given by way of nonlimiting indication with reference to the appended schematic drawings, in which.

Of course, the features, variants and various embodiments of the invention may be associated with one another, in various combinations, in so far as they are not mutually incompatible or mutually exclusive. It is in particular possible to imagine variants of the invention that comprise only a selection of the features described below and none of the other described features, if this selection of features is sufficient to make the invention technically advantageous with respect to the prior art or to differentiate it therefrom.

In particular, all the described variants and all the described embodiments are combinable together if there is no technical reason that prevents the combination thereof.

In the figures, elements common to a plurality of figures have been given the same references.

DETAILED DESCRIPTION OF THE INVENTION

Figure 1:
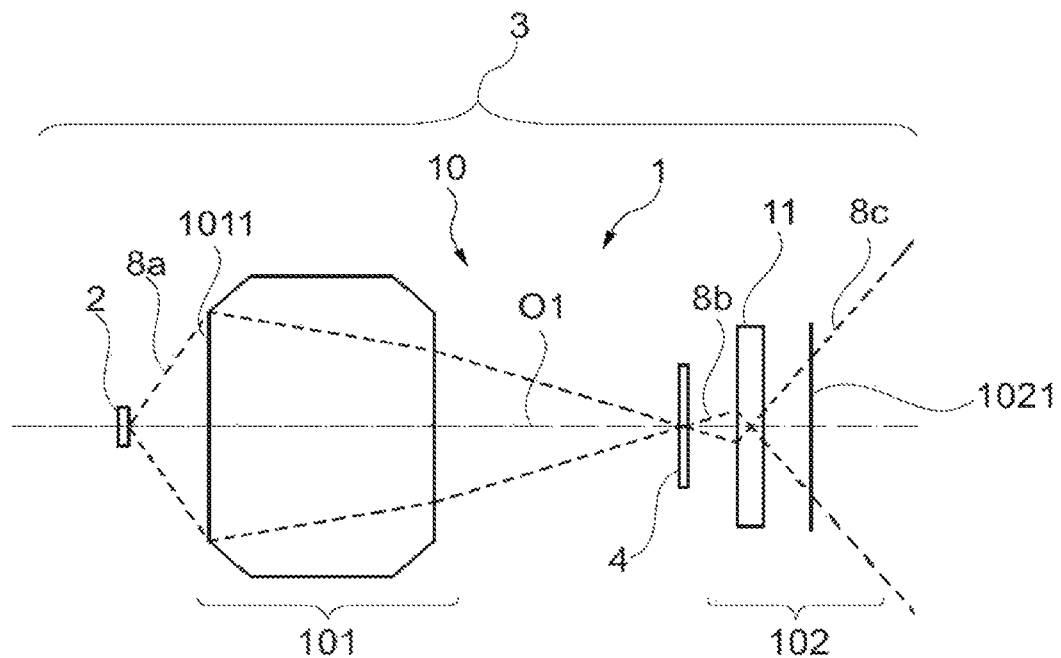
FIG. 1 illustrates a schematic view of a first embodiment of an optical system according to the first aspect of the invention and implemented in an interior lighting device.
Figure 2:
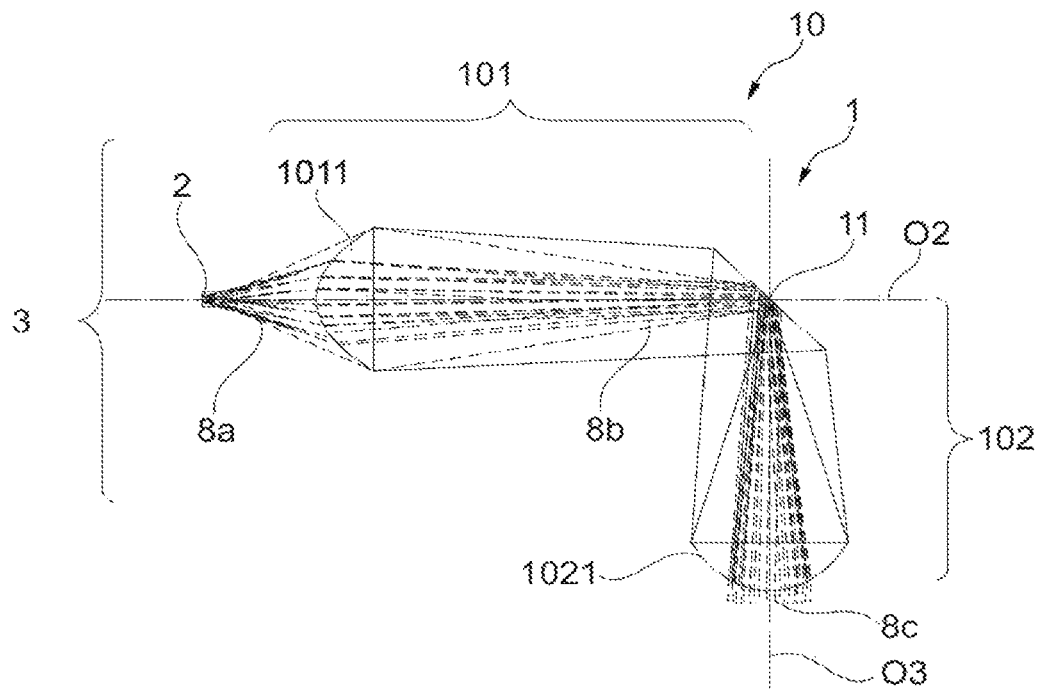
FIG. 2 schematically illustrates a second embodiment of an optical system according to the first aspect of the invention and implemented in an interior lighting device.
Figure 3:
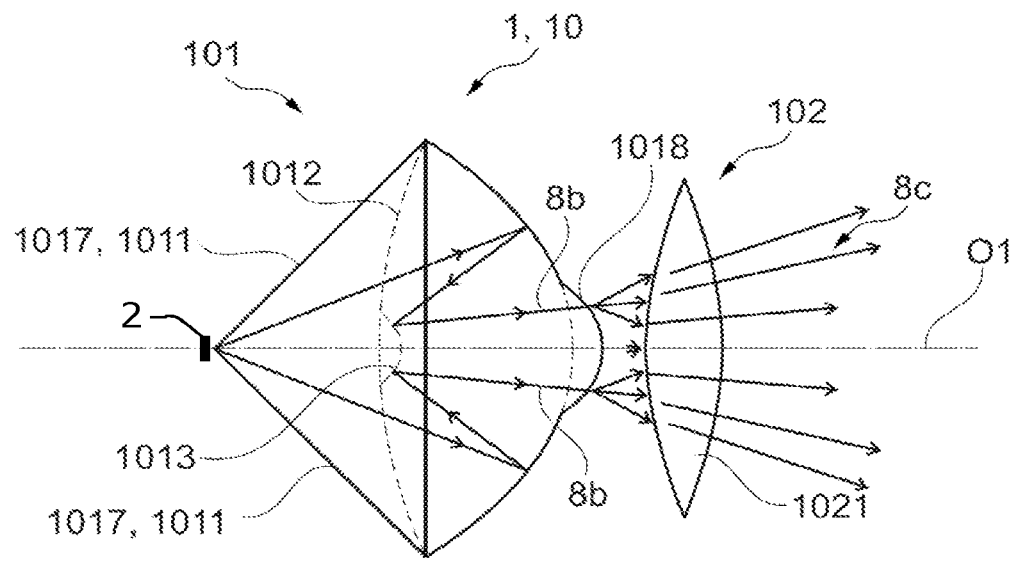
FIG. 3 illustrates a third embodiment of the optical system according to the first aspect of the invention.

With reference to FIGS. 1 to 3, the features common to each illustrated embodiment of an optical system 1 according to the first aspect of the invention will now be described. Particularities specific to each embodiment will subsequently be described in more detail with reference to each of FIGS. 1 to 4.

In the FIGURES described below, the paths of light rays inside of the optical system 1 according to the invention are given merely by way of indication, in order to facilitate comprehension of the operation of the invention.

Such an optical system 1 according to the first aspect of the invention comprises (i) a diffuser 11 configured to scatter incident light rays 8b that reach said diffuser 11, and (ii) an optical assembly 10 configured to project, onto the diffuser 11, a real image 4—schematically shown in FIG. 1—of a light source 2 intended to be used with the optical system 1. According to the first aspect of the invention, a first etendue of the light beam measured at the light source 2 is lower than a second etendue of the light beam measured at an exit face 1021 of the optical assembly 10. In other words, the optical system 1 according to the first aspect of the invention is configured to decrease an etendue of the light beam measured for the light rays 8a generated by the light source 2 intended to collaborate with said system, the etendue of the light beam thus decreased being measured at or beyond the exit face 1021 of the optical assembly 10, and formed by the light rays 8c exiting said optical system 1.

Such an optical system 1 according to the first aspect of the invention is advantageously intended to be implemented in an interior lighting device 3 and used in a motor vehicle to illuminate one portion of a passenger compartment. Such an interior lighting device 3 is according to the second aspect of the invention and comprises (i) at least one optical system 1 according to the first aspect of the invention and (ii) a light source 2 associated with the optical system 1 and configured to generate light rays 8a that the optical assembly 10 of the optical system 1 projects onto the diffuser 11 of said optical system 1, the light rays 8c that pass through the exit face 1021 of said optical system 1 being intended to illuminate one portion of a passenger compartment of the motor vehicle.

Advantageously, the light source 2 is optically coupled to the optical system 1, in such a way that most—and preferably all—the light rays 8a generated by the light source 2 pass through an entrance face 1011 of the optical system 1. To this end, the light source 3 is advantageously securely fastened to the optical system 1, either by direct attachment to said optical system 1, or by way of a rigid holder to which the optical system 1 and the light source 3 are fastened.

The light source 2 is advantageously a pixelated light source comprising a plurality of light-emitting diodes organized into a two-dimensional array. Thus, the optical system 1 according to the first aspect of the invention is particularly intended to be used in combination with an areal light source in which a plurality of light-emitting diodes form light rays 8a that are formed by the optical system 1. As will be detailed below with reference to FIGS. 1 to 4, the optical system 1 is configured to decrease the luminance of the light source 2 while preserving the spatial distribution of the various light-emitting diodes forming the pixelated light source.

More particularly, the optical assembly 10 of the optical system 1 comprises (i) a first portion 101 optically located between the light source 2 and the diffuser 11, and (ii) a second portion 102 optically located between the diffuser 11 and the exit face 1021 of the optical assembly 10. The first portion 101 and the second portion 102 are alternatively made of the same material and integrally formed or joined to each other by way of fastening means, such as for example adhesive bonding, or fastened to a common carrier (not shown in the FIGURES).

The first portion 101 of the optical assembly 10 is able to anamorphose the light source 2 with which the optical system is intended to collaborate, in order to make the luminance of said light source 2 decrease. The enlargement of the first portion 1011 of the optical assembly 10 is advantageously greater than or equal to 2, and preferably equal to 2.5 in order to sufficiently decrease the luminance of a pixelated light source and to make it compatible with a use to illuminate the interior of a motor-vehicle passenger compartment. Furthermore, the first portion 101 of the optical assembly 10 is configured to project a real image of the light source 2 onto or into proximity to the diffuser element. By "into proximity" to the diffuser, what is meant is that the real image is formed at a distance smaller than a few millimetres from the diffuser 11, and preferably upstream of the diffuser 11 in the direction of propagation of the light rays 8a, 8b, 8c.

The second portion 102 of the optical assembly 10 takes the form of an optic for projecting the light rays scattered by the diffuser 11. In other words, the second portion 102 of the optical assembly 10 is configured to create a second real image of the first real image of the light source 2 created at the diffuser 11 by the first portion 101 of the optical assembly 10.

The first portion 101 and/or the second portion 102 of the optical assembly 10 are individually or collectively configured to preserve a pixelization of the light source 2 with which the optical system 1 is configured to collaborate when it is implemented in an interior lighting device 3. In other words, when the light source 2 is composed of a plurality of light-emitting diodes, then the optical assembly 10 is configured to preserve a spatial disassociation of the light rays emitted by each light-emitting diode of said light source 2.

The diffuser 11 of the optical assembly 10 makes it possible to make the incident light rays 8b scatter in a plurality of directions, isotropically or anisotropically, depending on the sought-after effects. As illustrated in FIGS. 1 to 3, the diffuser 11 is advantageously located in a position optically intermediate between the entrance face 1011 and the exit face 1021 of the optical assembly 10 of the optical system 1.

The diffuser 11 and the optical assembly 10 are advantageously made from optically transparent materials, in particular materials that are optically transparent at the wavelengths of the light rays generated by the light source 2 with which the optical system 1 is liable to collaborate. By way of nonlimiting example, the diffuser 11 and/or the optical assembly 10 are advantageously made from glass or from a plastic such as for example polycarbonate (PC), polypropylene carbonate (PPC) or polymethyl methacrylate (PMMA).

The optical system 10 according to the first aspect of the invention may be given a number of configurations in order to meet the dimensional constraints with respect to bulk of various motor-vehicle passenger compartments, and in particular those due to the dimensions of the ceiling lights into which the optical system is preferably intended to be integrated. By way of nonlimiting example, the particularities of FIGS. 1 to 4 will now be described in more detail.

FIG. 1 illustrates a schematic version of a first embodiment of the optical system 1 implemented in an interior lighting device 3, and in which the optical system 1 lies on a single optical axis O1.

The first portion 101 of the optical assembly 10 is located at distance from the light source 2 and possesses a large admission angle, so that most—and preferably all—of the light rays 8a generated by the light source 2 penetrate into the optical system 10 through the entrance face 1011 of the first portion 101 of the optical assembly 10. The first portion 101 is formed by one or more lenses and/or by one or more reflective surfaces, in order to form the real image 4 of the light source 2 in a position that is optically intermediate between the first portion 101 and the diffuser 11, along the single optical axis O1.

All of the incident light rays 8b that reach the diffuser 11 beyond the real image 4 of the light source 2 together form a cone an opening angle of which is smaller than that of a cone formed by all of the light rays 8a generated by the light source 2.

The diffuser 11 of the optical system 10 illustrated in FIG. 1 is transparent so as to make it a "through" diffuser: the incident light rays 8b that reach the diffuser 11 pass through it axially along the optical axis O1 and are scattered in a plurality of directions about said optical axis O1, at a face that is located on the side of the exit face 1021 of the optical assembly.

The optical diffuser 11 illustrated in FIG. 1 is advantageously planar. Furthermore it has at least one rough surface, for example a grained surface, in order to scatter the incident light rays 8b.

In this first embodiment, the diffuser 11 and at least one portion 101, 102 of the optical assembly 10 are securely fastened to a holder—which is not shown in FIG. 1. Alternatively, all or some thereof may be made of the same material and integrally formed in order to form only a single optical part, to decrease the dimensional bulk of the optical system and to facilitate its integration into an interior lighting device 3.

FIG. 2 illustrates a schematic version of a second embodiment of the optical system 1 implemented in an interior lighting device 3, and wherein the optical system 1 has a dog-legged configuration.

The first portion 101 of the optical assembly 10 is located at distance from the light source 2 and possesses a large admission angle, so that most—and preferably all—of the light rays 8a generated by the light source 2 penetrate into the optical system 10 through the entrance face 1011 of the first portion 101 of the optical assembly 10. The first portion 101 is formed by one or more lenses and/or by one or more reflective surfaces in order to form the real image of the light source 2 at the diffuser 11, along a first optical axis O2 that extends in a first direction.

The diffuser 11 of the optical system 10 illustrated in FIG. 2 is reflective and it is oriented with respect to the first optical axis O2 so as to make a nonzero angle that is preferably comprised between 20° and 70°. In order to make it reflective, the diffuser 11 comprises at least one reflective surface, for example obtained by aluminium coating. The diffuser 11 is thus configured to reflect at least half of the incident light rays 8b so as to steer them in the direction of a pupil of the projecting optic forming the second portion 102 of the optical assembly 10. Furthermore, the diffuser 11 comprises at least one rough surface, for example a grained surface, in order to scatter the incident light rays 8b. The reflective surface is advantageously distinct from the rough surface. In the schematic example illustrated in FIG. 2, the rough surface is the surface that the light rays 8b reach when they are formed by the first portion 101 of the optical assembly 10; and the reflective surface is the surface that is located opposite said rough surface with respect to a midplane of the diffuser 11. The optical diffuser 11 illustrated in FIG. 2 is advantageously planar.

The second portion 102 of the optical assembly 10 of the optical system 1 illustrated in FIG. 2 is located downstream of the diffuser 11 in the direction of propagation of the light rays 2 in the optical system 1. The second portion 102 is oriented along a second optical axis O2 that makes a nonzero angle to the first optical axis O1, which angle is preferably comprised between 20° and 160° depending on the desired application, and more preferably equal to 90°.

In this second embodiment, the diffuser 11 and at least one portion 101, 102 of the optical assembly 10 are securely fastened to a holder—which is not shown in FIG. 2. Alternatively, all or some thereof may be made of the same material and integrally formed in order to form only a single optical part, to decrease the dimensional bulk of the optical system and to facilitate its integration into an interior lighting device 3.

Figure 4:
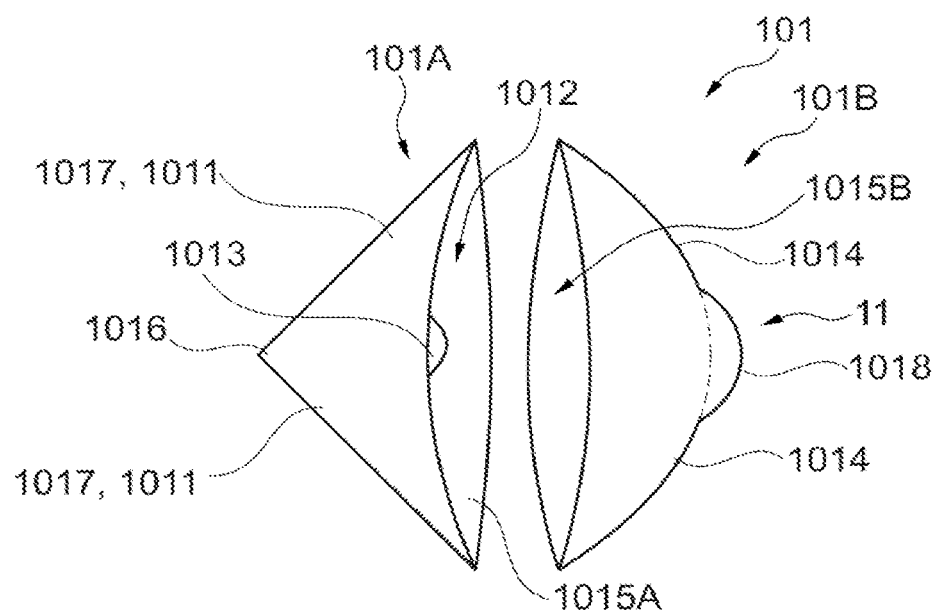
FIG. 4 illustrates an exploded detail view of a first portion of the optical assembly implemented in the optical system illustrated in FIG. 3.

FIG. 3 illustrates a schematic version of a third embodiment of the optical system 1 according to the first aspect of the invention, in which embodiment the optical system 1 lies on a single optical axis O1. In order to allow this third embodiment to be better understood, FIG. 4 illustrates an exploded schematic view of the first portion 101 of the optical assembly.

The first portion 101 of the optical assembly 10 is formed by a first optical part 101A and a second optical part 101B that are advantageously joined to each other via their contact faces 1015A, 1015B. They are preferably adhesively bonded to each other via their contact faces 1015A, 1015B.

The first optical part 101A has a conical general shape, the light source 2 being intended to be placed in proximity to or against an apex 1016 of said conical surface. The first optical part 101A is configured to collect the light rays generated by the light source 2. The conical surface is thus delineated by linear exterior walls 1017 that lie about the optical axis O1 between the apex 1016 and the contact surface 1015A. The exterior walls 1017 of the first optical part 101A are advantageously transparent in order to let the light rays generated by the light source pass. The exterior walls 1017 thus form the entrance face 1011 of the optical assembly 10 of the optical system according to this embodiment.

The light rays that pass through the exterior walls 1017 of the conical surface strike a concave surface 1012 located between said exterior walls 1017 and about the optical axis O1. Collectively, the exterior walls 1017 and the concave surface 1012 form a lens for forming the light rays generated by the light source: the exterior walls 1017 and the concave surface 1012 of the first optical part 101A generate a positive vergence.

The concave surface 1012 is transparent so as to be able to be passed through by the light rays.

The light rays that pass through the first optical part 101A are projected out of the first optical part 101A in the direction of the second optical part 101B. These light rays—which propagate through the interior of the first optical part 101A—then reach the second optical part 101B and pass through the contact surface 1015B thereof.

The second optical part 101B has a concave shape: exterior walls 1014 of said second optical part 101B are non-linear, and preferably parabolic. The exterior walls 1014 of the second optical part are made reflective, for example by way of deposition of aluminium on the surface thereof.

Therefore, the exterior walls 1014 of the second optical part 101B form a second concave reflector configured to reflect the light rays coming from the first optical part 101A in the direction of said first optical part 101A in such a way that they converge towards the optical axis O1.

These light rays reach the first optical part 101A in a region that is near the optical axis O1 and that forms a first convex reflector 1013. It will be noted that the first convex reflector 1013 is made of the same material as and integrally formed with the conical surface: it protrudes from the concave surface 1012 located inside the conical surface of the first optical part 101A, symmetrically about the optical axis O1. The first convex reflector 1013 is obtained by depositing a metal, for example aluminium, on its surface.

The light rays that reach the first convex reflector 1013 are steered back in the direction of the second optical part 101B, towards a region that is near the optical axis O1, relative to the exterior walls 1014 of the second optical part 101B. Thus, the first convex reflector 1013 of the first optical part 101A contributes to forming a real image of the light source capable of being associated with the present optical assembly 10.

The real image thus formed is formed in the region near the optical axis O1 of the second optical part 101B. To this end, the second optical part comprises a transparent curved surface 1018 that protrudes from the exterior walls 1014 of the second optical part 101B. More particularly, the transparent curved surface 1018 takes the form of a dome that extends symmetrically about the optical axis 101B and that protrudes from the exterior walls 1014.

The transparent curved surface 1018 here forms the diffuser 11 of the optical system 1 according to the first aspect of the invention. To this end, the transparent curved surface 1018 is advantageously rough so as to be able to scatter the incident light rays 8b in a plurality of directions about the optical axis O1.

Thus, the first optical part 101A and the second optical part 101B together make it possible to create, in proximity to the transparent curved surface 1018, a real image of the light source intended to collaborate with the optical system 1. The real image thus formed is enlarged with respect to its actual dimensions, so as to decrease its luminance.

Subsequently, as shown in FIG. 4, the first portion 101 of the optical assembly 10 is associated with the second portion 102 in order to project the real image of the light source out of the exit face 1021 of the optical system 1.

The optical system illustrated in this third embodiment is particularly compact and economical to manufacture, because it results from the assembly of the two optical parts 101A, 101B and from their combination with the second portion 102 of the optical assembly 10.

In summary, the invention in particular relates to an optical system 1 and to an interior motor-vehicle lighting device 3 comprising a light source 2 coupled to such an optical system 1. The optical system 1 comprises a first portion 101 of an optical assembly 10 that allows a real image 4 of the light source 2 to be projected into proximity to a diffuser 11 of the optical system 1. The optical assembly 10 of the optical system 1 also comprises a second portion 102 that plays the role of a projecting optic in order to project, out of said optical system 1, a real image of the real image of the light source 2 formed in proximity to the diffuser 11. The optical system 1 according to the invention allows a luminance of the light source 2 of the interior lighting device 3 to be decreased while preserving its pixelization, thus allowing light sources based on light-emitting diodes and driven with a high-amperage electrical current to be used in motor-vehicle passenger compartments without any risk to the occupants of said passenger compartments.

Of course, the invention is not limited to the examples that have just been described and many modifications may be made to these examples without departing from the scope of the invention. In particular, the various features, forms, variants and embodiments of the invention may be associated with one another in various combinations in so far as they are not mutually incompatible or mutually exclusive. In particular, all the variants and embodiments described above are combinable with one another.

The invention claimed is:

1. Optical system for a motor-vehicle passenger compartment, the optical system comprising:
    a light source;
    a diffuser configured to scatter incident light rays of a light beam generated by the light source; and
    an optical assembly configured to project a real image of the light source onto the diffuser;
    wherein a first etendue of the light beam measured at the light source is smaller than a second etendue of the light beam measured at an exit face of the optical assembly.

2. Optical system according to claim 1, wherein the optical assembly comprises:
    a first portion optically located between the light source and the diffuser, the first portion being able to anamorphose the light source;
    a second portion optically located between the diffuser and the exit face of the optical assembly, the second portion being an optic for projecting light rays scattered by the diffuser.

3. Optical system according to claim 2, wherein the first portion of the optical assembly is made from the same material as and integrally formed with the diffuser, and/or the second portion of the optical assembly is made of the same material as and integrally formed with the diffuser.

4. Optical system according to claim 2, wherein the first portion comprises a first reflector associated with a second reflector, the second reflector being configured to reflect light rays reflected by the first reflector.

5. Optical system according to claim 4, wherein the first reflector is configured to concentrate the light rays on the second reflector.

6. Optical system according to claim 2, wherein a first optical axis associated with the first portion of the optical assembly is secant with a second optical axis associated with the second portion of the optical assembly.

7. Optical system according to claim 6, wherein an angle made by the first optical axis and the second optical axis is comprised between 70° and 110°.

8. Optical system according to claim 2, wherein the diffuser is a through diffuser, the light rays incident on a face of incidence of the diffuser being scattered at a face that is opposite the face of incidence with respect to the first portion of the optical assembly.

9. Optical system according to claim 1, wherein the diffuser is configured to be at least partially reflective.

10. Optical system according to claim 1, wherein the diffuser comprises a rough scattering surface.

11. Optical system according to claim 10, wherein the rough scattering surface of the diffuser is grained.

12. Optical system according to claim 1, wherein the diffuser is configured to diffract the incident light rays.

13. Optical system according to claim 1, wherein the diffuser comprises a curved surface.

14. Interior lighting device for a motor-vehicle ceiling light, the interior lighting device comprising:
    an optical system according to claim 1;
    a light source associated with the optical system and configured to generate light rays that the optical assembly of the optical system projects onto the diffuser of the optical system, the light rays that pass through the exit face of the optical system being intended to illuminate one portion of a passenger compartment of the motor vehicle.

15. Interior lighting device according to claim 14, wherein the light source is pixelated and comprises a plurality of light-emitting diodes organized into an array.

16. Optical system according to claim 3, wherein the first portion comprises a first reflector associated with a second reflector, the second reflector being configured to reflect light rays reflected by the first reflector.

17. Optical system according to claim 3, wherein a first optical axis associated with the first portion of the optical assembly is secant with a second optical axis associated with the second portion of the optical assembly.

18. Optical system according to claim 2, wherein the diffuser is a through diffuser, the light rays incident on a face of incidence of the diffuser being scattered at a face that is opposite the face of incidence with respect to the first portion of the optical assembly.

19. Optical system according to claim 2, wherein the diffuser is configured to be at least partially reflective.

20. Optical system according to claim 2, wherein the diffuser comprises a rough scattering surface.

* * * * *